United States Patent [19]
Hodgson

[11] Patent Number: 5,210,703
[45] Date of Patent: May 11, 1993

[54] APPARATUS AND METHODS FOR TESTING OPTICAL COMMUNICATIONS NETWORKS

[76] Inventor: Derek G. Hodgson, British Aerospace (Military Aircraft) Limited, HU15 1 EQ Brough, United Kingdom

[21] Appl. No.: 602,145

[22] Filed: Oct. 24, 1990

[30] Foreign Application Priority Data

Oct. 24, 1989 [GB] United Kingdom ............... 8923933

[51] Int. Cl.5 ............................................. G06F 15/20
[52] U.S. Cl. ..................... 364/525; 359/178; 371/25.1
[58] Field of Search ............ 364/525, 551.01; 359/110, 173, 177, 178; 356/73.1; 371/25.1

[56] References Cited

U.S. PATENT DOCUMENTS

| | | | |
|---|---|---|---|
| 4,708,422 | 11/1987 | Arnoux et al. | 359/110 |
| 4,710,976 | 12/1987 | Wakabayashi et al. | 359/177 |
| 4,829,596 | 5/1989 | Barina | 359/110 |

FOREIGN PATENT DOCUMENTS 2111337  6/1983  United Kingdom ............... 359/178

Primary Examiner—Parshotam S. Lall
Assistant Examiner—Ellis B. Ramirez
Attorney, Agent, or Firm—Nixon & Vanderhye

[57] ABSTRACT

A handheld test set including a microprocessor-controlled optical transmitter (17) and receiver (18) for testing optical networks such as star couplers. Light intensity reflected from a star coupler under test is compared with a stored value in order to indicate a pass or fail status. Test results are stored in a memory (21) for subsequent downloading into a database.

7 Claims, 4 Drawing Sheets

APPARATUS AND METHODS FOR TESTING OPTICAL COMMUNICATIONS NETWORKS

BACKGROUND OF THE INVENTION

1. Field of the Invention

The present invention relates to optical communications networks and in particular to flight control systems and other systems for aircraft employing fibre-optic networks, i.e., so called fly-by-light systems. The invention is especially concerned with the provision of improved apparatus and methods for testing such fibre-optic networks.

2. Discussion of Prior Art

A fibre-optic communications network usually comprises at least one light source, a light modulator for modulating the light source according to variations in some parameter relating to one system component, information concerning which is to be transmitted as a light signal to one or more remote system components, fibre-optic light guides inter-connecting said system components, light demodulators for detecting and demodulating the received light signals and, transducers for converting the light signals to electrical or mechanical signals for activating the remote system components accordingly.

The points in the system at which light is coupled into or out of the fibre-optic light guides are called Nodes. Light from a single light guide may be split into a number of separate light guides simultaneously by means of devices known as star couplers.

For example, a flight control computer may be connected to several flying control actuators, e.g., ailerons, rudder, elevators, flaps, slats, engine throttle by means of a network of fibre-optic light guides. In order to provide emergency back-up arrangements, operational in the case of failure or partial failure of the main flight control system the computer the actuators and their receiving elements may be duplicated, triplicated or even quadrupled to form independent systems. The paths of the light guides forming the networks associated with those independent systems may also be varied to reduce the possibility of simultaneous loss of the main system and all its back-ups. The signals provided by the various elements of each independent system may be compared at various stages of their networks and subjected to logic voting arrangements to determine the most likely signal required to be acted upon of those presented or to determine the location of a failed link in the network and to make alternative routing arrangements.

Such systems are obviously complex, but it is vital to check as far as possible, both during manufacture and in routine servicing of operational aircraft, that the fibre-optic links between nodes and star couplers are sound. Such network checking procedures are known as Network Characterisation (or Network Loss Measurements).

The measurements are required to demonstrate the quality of the optical networks both during assembly and before the installation and connection of the Avionic equipment.

A typical known network comprises two 16 node star couplers and associated optical cabling and connectors. When assembled these networks can take several days to characterise using simple test equipment under laboratory conditions. This can be done by connecting an optical power meter at one node and then moving the transmitter around the network until all free ends had been checked. Having done this the power meter is moved on to the next node and the process repeated.

This task is onerous within the context of mass production of fighter aircraft. For example a 32 node network tested with light propagated in both directions would require 992 separate measurements to be taken and logged. Streamlining the network characterisation process within the production environment is therefore highly desirable and should result in substantial recurring cost benefits.

SUMMARY OF THE INVENTION

The objects of the present invention are to provide test equipment to simplify and speed up the network characterisation process and to have the following features:

i) elimination of the necessity for a separate inspection stage,
ii) provision of positive proof of successful testing,
iii) operable without special skill requirements,
iv) provision of single ended single operator operation,
v) to have automated storage and recovery of test results,
vi) provision for bidirectional testing if required,
vii) to be hand-held and self-contained,
viii) to have a facility to allow performance measurements to be undertaken without dismounting connectors from polishing fixtures, and
ix) to be rugged.

According to the present invention an optical communications network test equipment for testing parameters of light transmitted and received via a plurality of fibre optic cabled light paths is characterised by: programmable data storage means, for storing test stimulus data, and expected and actual response data for each of said light paths; an optical transmitter for transmitting light with parameters determined by said test stimulus data; an optical receiver for receiving light in response to actions of said transmitter and for producing said actual response data; an optical coupler for coupling light between the transmitter and receiver and said cabled light paths; and comparator means for comparing said actual response data with said expected response data.

The provision of test equipment according to the statement made above, preferably in hand-held form enables the following new fibre-optic network test methods, according to the invention in a further aspect thereof, to be realised namely:

METHOD 1

This checks the attenuation of the optical path with light propagated in one direction.

METHOD 2

This injects a known amount of light into a network node under test and measures the light reflected back from a star coupler.

METHOD 3

This method tests the optical path between any two subsystem connections in both directions.

Equipment in accordance with the invention is capable of operating using any of the test methods listed above.

BRIEF DESCRIPTION OF THE DRAWINGS

An embodiment of the test equipment according to the invention in its first aspect will now be described by way of example only and with reference to the following of the accompanying drawings.

DESCRIPTION OF THE PREFERRED EMBODIMENTS

The use of the test set and base station, to be described with reference to the above drawings, in examples of the three test methods according to the invention in its second aspect will then be described by way of example only and with reference to FIGS. 4a, 4b, and 4c which show schematically a simple fiber optic network under test.

Figure 1:
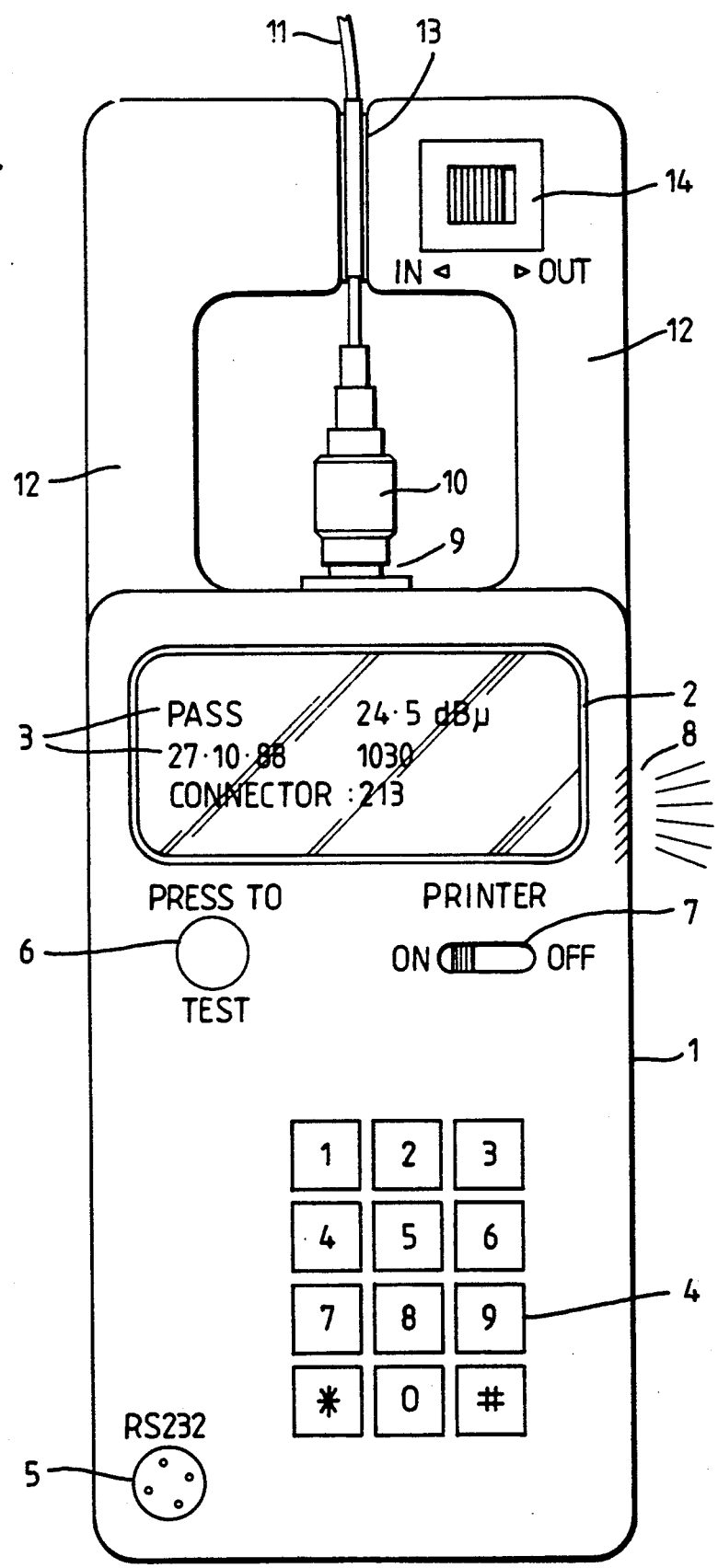
FIG. 1, which shows a hand-held fibre optic test set according to the invention, in use, FIG. 2, which shows a block schematic circuit diagram of the test set shown in FIG. 1, and FIG. 3, which shows a block schematic circuit diagram of a base station to be used in conjunction with the test set shown, in FIGS. 1 and 2.

A hand-held fibre optic test set, according to the invention, is shown full scale in FIG. 1. It comprises a generally rectangular shaped case 1 enclosing electronic circuits to be described in more detail below with reference to FIG. 2. Disposed on a face of the case are; a liquid crystal or similar multi-line, multi-character display 2 on which information 3 in alpha-numeric form may be displayed during use; a numeric keyboard 4 having additional * and # keys after the manner of modern telephone hand sets; an RS 232 serial digital communications socket 5; a test button 6; and, a printer power control switch 7. On one side of the case 1 is mounted a miniature loud speaker 8.

Centrally disposed on top of the case 1 is an optical test port 9, to which may be connected by a conventional optical coupling connector 10 to a fibre optic cable such as that shown at 11. Symmetrically disposed about the test port 9 are two L-shaped clamp arms 12, the longer sides of which are attached to or form part of the case 1 and the shorter sides of which are in mutually opposed relationship to define a gap into which a fibre optic cable such as 11 may be supportively clamped. One of the arms 12 carries a head 13 of a built-in cable market or printer. The position of the printer head 13 relative to an inserted cable 11 may be controlled by a sliding control button 14.

Inside the case 1 is the electronic circuitry controlling the operations of the test set in its various modes of operation. The electronics is shown schematically in FIG. 2. The optical test port 9 is connected by an internal fibre optic cable 15 to an optical coupler 16 and thence to the output of an optical transmitter 17 and the input of an optical receiver 18. The transmitter 17, is arranged to transmit light signals in response to electrical signals from a digital to analogue converter 21. The receiver 18 generates electrical signals in response to light incident thereon and applies the signals to an analogue to digital converter 19. The output of the analogue-to-digital converter 19 is fed to a data communications bus 20. The digital-to-analogue converter 21 is also connected to the bus 20.

The communications bus 20 is also connected to, serve a random access memory (RAM) 21, a read only memory (ROM) 22, an RS232 serial communications circuit 23 which is linked to the RS232 input/output socket 5 mentioned earlier, and an input/output (1.0) buffer unit 24. The buffer unit 24 is connected to receive signals representing selected key presses of the keyboard 4 and to transmit character definition signals to the display 3 and the printer 13. The buffer unit 24 is also connected to supply transmit enabling signals to the optical transmitter 17 and sensitivity setting signals to the receiver 18.

A microprocessor 25 is connected via the bus 20 to control the operations of and communications between all the units connected to the bus. The electronic circuitry inside the case 1 is powered by a rechargeable battery/mains unit 26 connected to a mains input socket 28 and a low voltage charging socket 27 both mounted at convenient points on the case 1.

Figure 2:
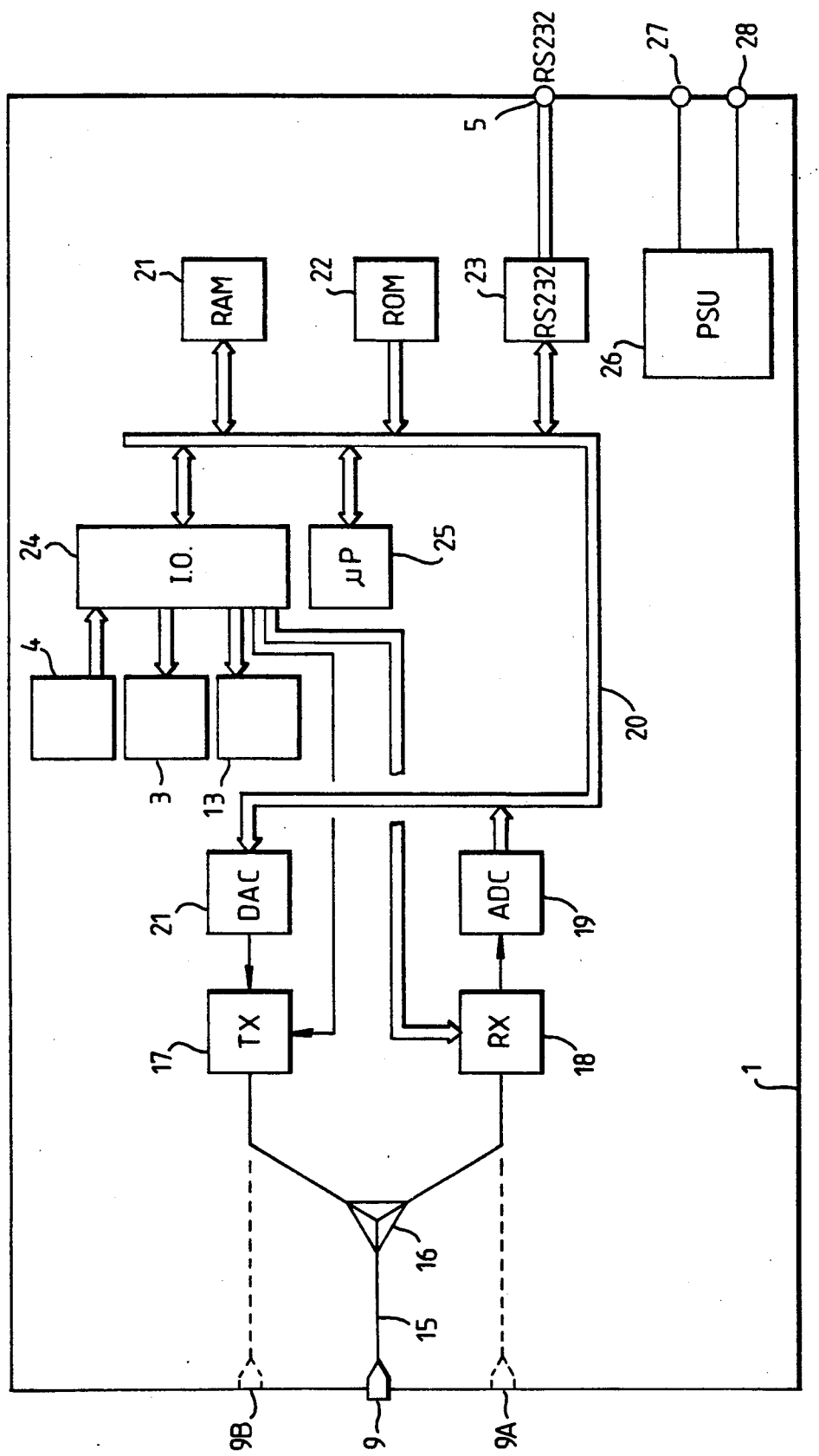
Figure 3:
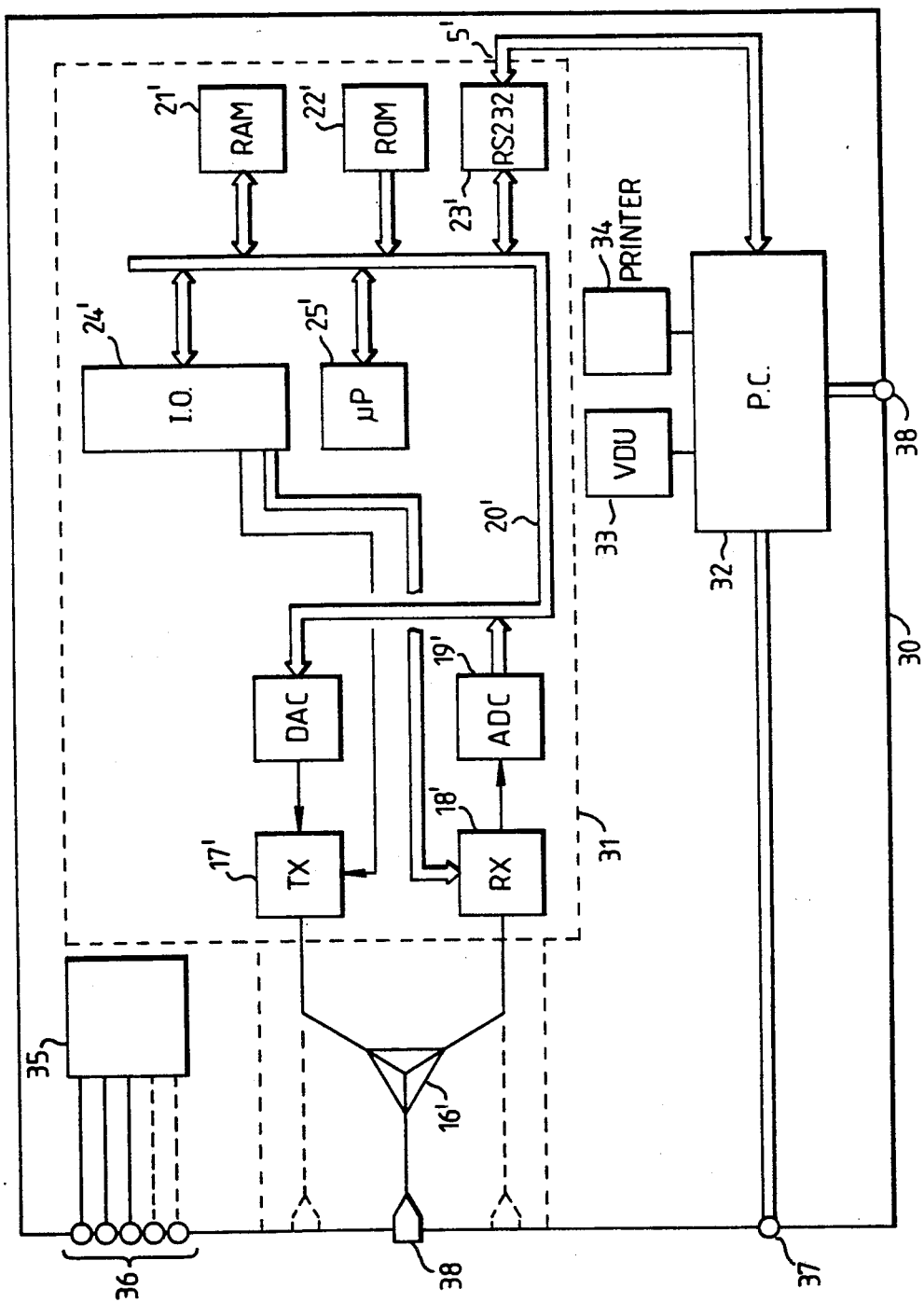

The hand-held test set shown in FIGS. 1 and 2 is designed to co-operate from time to time with a base station 30 the electronic circuitry of which is shown schematically in FIG. 3. One or more hand-held test sets may be inserted in the base station and when so inserted the circuitry of the base station is then interconnected with that of the hand-held test set as shown in FIG. 3. The components of the hand-held test set are shown again for convenience within an area enclosed by dotted line 31 and have been given reference numerals corresponding to their equivalents in FIG. 2 but 'dashed' to indicate that a sub-set of the components shown in FIG. 2 are being used in this configuration.

The base station 30 comprises a personal computer (PC), such as an IBM PC, 32 and associated visual display unit (VDU) 33 and printer 34, and a battery charger 35 which has a plurality of low voltage charger outputs 36 so that a number of hand-held test sets may be re-charged simultaneously. The PC 32 has an RS232 communications port 37 and network communications link by means of which it can address and communicate with a number of hand-held test sets simultaneously. The test set shown in FIG. 3 is seen connected to the PC 32 via its RS232 serial communications port 5'. The optical test ports 9 of each test set are connected to optical calibration ports 38 of an optical calibration set (not shown) when at the base station.

In use, to check a fibre optic communications network an operator draws a hand-held test set, as shown in FIG. 1, from the base station, as shown in FIG. 3, where it has previously been charged, optically calibrated and programmed by means of the charger 35, the calibration port 38 and the PC 32 respectively.

The operator upon completion of a termination of or the installation of, an optical cable run, connects the node to be checked to the test set as shown at FIG. 1 by means of the connector 9. The connector sleeve number is then keyed in by the operator (in this case 213) on keyboard 4 and thence to the buffer unit 24 (FIG. 2).

With the printer switch in the OFF position the operator next presses the test button 6, resulting in one of two possible results; either an indication that the node under test passed or that it failed. Note: rather than a separate printer enable switch as shown this function could be combined with the printer head in-out movement.

If the test result is a PASS then the operator enables the printer by means of switch 7 and presses the test button 6 once again. This results in the printer marking the cable sleeve with the number previously entered by the operator and temporarily stored in buffer unit 24.

This confirms that the correct node number has been entered and tested by the operator. The printed code on the sleeve is proof of successful testing. The database within the test set (RAM 21) is then updated with the new results.

Should the initial test FAIL then the operator is warned with a suitable caption on the display 3 together with an audio tone via speaker 8. The data base (RAM 21) is updated to indicate the failure. The printer whether enabled or not under these circumstances does not operate because the microprocessor 25 is programmed to disable the buffer unit's transfer operation in these circumstances.

Each press of the test button 6 causes the microprocessor 25 to select from a previously stored look-up table in RAM 21 a test signal appropriate to the node and cable run under test and apply it to the digital to analogue converter 21. The buffer unit 24 energises the transmitter 17 which sends a light of known intensity into the cable via the coupler 16 and port 9 or 9b. The received optical signals, which may be reflected from a star coupler into the same cable under test, or diverted into a further cable, (see FIGS. 4a and 4b) is then received at the port 9 or the separate port 9b respectively and by the optical receiver 18. The optical receiver 18 is set to a predetermined sensitivity by means of the microprocessor 25, a look-up table in RAM 21 and the buffer unit 24, and produces an electrical signal output corresponding to the intensity of the received light. This analogue signal is converted to digital form by converter 19 and sent via bus 20 to be stored in RAM 21 in association with the cable sleeve number of the cable under test for subsequent read-out at the base station as described below.

After the working shift during which a number of cables will have been tested the portable tester would be returned to the base station and connected to PC 32 via the serial communications link (RS232) 5' and an optical calibration port 38.

The base station, under the control of suitable software in PC 32, would calibrate the portable tester's optical receiver 18' and transmitter 19' thus establishing whether the test data recovered during the shift was viable or not. Next the base station would down load the test results held within the test set memory 21' and write this data into files held within the base station PC 32's memory. (See FIG. 3)

During the calibration process the base station would characterise the test set's transmitter 18' and receiver 19' by writing the correction vectors into the non-volatile memory 22' contained within the test set. This mechanism would ensure that quality was maintained at all times and has the advantage of being performed automatically (not labour intensive).

Finally the test set would be connected to the fast action charger port 36 and the RS232 serial data link 5' used to down load the next shift termination instructions.

By incorporating the cable sleeve printer and the control logic within a single hand-held test set in this way, positive proof is provided of satisfactory testing. By storing the results and subsequently down loading them for analysis in the PC the operator is freed from the burden of writing and transcribing results to a computer by hand. The equipment provides automatic calibration of the hand-held testers, or any number of them, both before and after use.

Figure 4C:
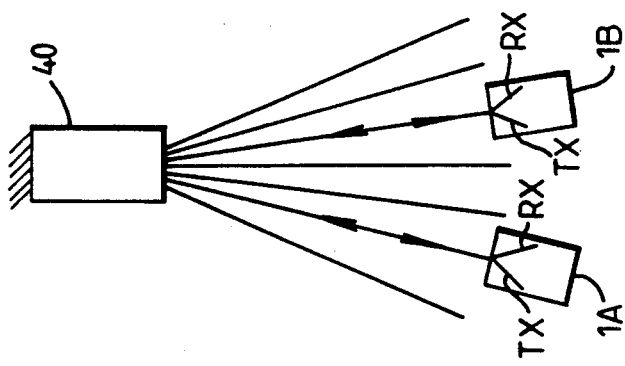
FIGS. 4a through 4c show a fiber optic network under test.
Figure 4B:
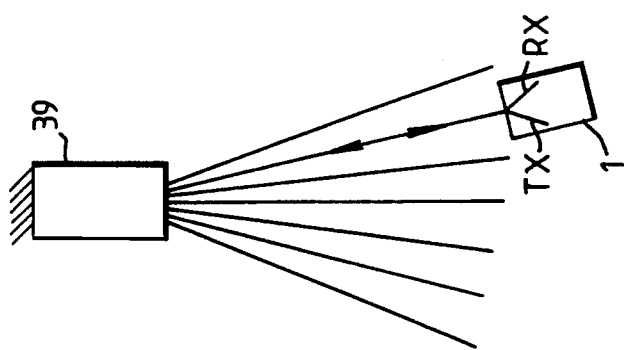
Figure 4A:
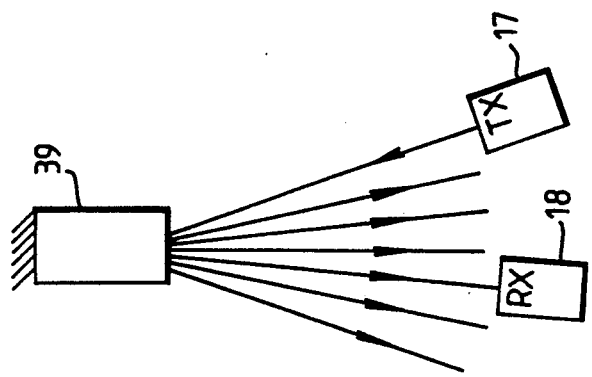

The equipment described may be used in three testing methods, illustrated in FIGS. 4a, 4b and 4c, which considerably speed up and improve the efficiency and accuracy of the characterisation process referred to above. The methods are:

METHOD 1 (FIG. 4a)

This is a simple approach which checks the attenuation of the optical path with light propagated in one direction i.e., from the designated test port on a star coupler 39 to the subsystem node under test. A known amount of optical power is injected at the selected test node at the star coupler, the test simply comprises measuring the light at the connector under test.

METHOD 2 (FIG. 4b)

For use with reflective star couplers only.

This test relies on injecting light of known intensity into the network node under test and measuring the intensity of light reflected back from the star coupler 39.

The advantage of this test method is that it can be carried out from one point in the network only, without the necessity to connect test equipment 1 at two points within the network.

METHOD 3 (FIG. 4c)

Finally this method tests the optical path between any two subsystem 40 connections in both directions. The method requires two test sets 1A and 1B, one connected at the remote port under test and the other connected at the local port to be tested. The remote test set acts as a transponder transmitting a calibrated optical power level when cued by the local test set. The remote transponder must also be capable of measuring the received optical power and conveying this information to the local test set, preferably over the bus under test, thus removing the need for interconnecting cabling.

All test results would be stored in non-volatile memory RAM21 or ROM22 within the test set and down loaded into a PC hard disk data base each day. The records so generated could be used for many purposes, for example; they would give an accurate account to production managers of the current state of the aircraft build, the records could be used for bonus calculations, the network profile so generated would accompany the aircraft throughout its life undergoing modification as changes and repairs were made.

We claim:

1. An optical communications network test equipment for testing parameters of light transmitted and received via a plurality of fibre optic cabled light paths, said test equipment including:
    an optical transmitter means for transmitting light with parameters determined by test stimulus data;
    an optical receiver means for receiving light in response to actions of said transmitter means and for producing actual response data;
    an optical coupler means for coupling light between said transmitter means and said receiver means and said cabled light paths;
    programmable data storage means for storing said test stimulus data, and expected and actual response data for each of said light paths, said storage means having an output connected to said transmitter means, and an input connected to said receiver means; and comparator means, connected to said storage means, for comparing said actual response data with said expected response data.

2. An optical communications network test equipment for testing parameters of light transmitted and received via a plurality of fibre optic cabled light paths, said test equipment including a hand-held fibre optic test set, said test set comprising:

programmable data storage means for storing a plurality of test signals and for storing a plurality of receiver sensitivities;

first means for retrieving at least one stored test signal;

second means for retrieving at least one stored receiver sensitivity;

an optical transmitter means, responsive to said at least one stored test signal retrieved by said first retrieving means, for transmitting light along at least one of said plurality of fibre optic cabled light paths;

an optical receiver means, responsive to said at least one stored receiver sensitivity retrieved by said second retrieving means, for receiving light in response to light transmissions by said optical transmitter means on at least one of said plurality of fibre optic cabled light paths and for producing actual response data in response thereto;

optical coupler means, responsive to said transmitter means, said receiver means and at least one of said cabled light paths, for coupling light transmitted by said transmitter means into said at least one of said cabled light paths, and for coupling light received along at least one of said cabled light paths into said receiver means; and comparator means responsive to said receiver means and to said programmable data storage means, for comparing actual response data with expected response data and providing an output indicative of said comparison.

3. The test set according to claim 2, further including printer means for printing, in response to said comparator means, information related to said comparison.

4. The test set according to claim 2, wherein said printer means comprises a cable sleeve printer.

5. The test set according to claim 2, wherein in said optical coupler means light transmitted by said transmitter means and light received by said receiver means is coupled into and out of only one of said at least one cabled light paths.

6. The test set according to claim 2, wherein in said optical coupler means light transmitted by said transmitter means and light received by said receiver means is coupled into and out of separate ones of said at least one cabled light paths.

7. An optical communications network test equipment for testing parameters of light transmitted and received via a plurality of fibre optic cabled light paths, said test equipment including a base station and at least one hand-held fibre optic test set, said test set comprising:

programmable data storage means for storing a plurality of test signals and for storing a plurality of receiver sensitivities;

first means for retrieving at least one stored test signal;

second means for retrieving at least one stored receiver sensitivity;

an optical transmitter means, responsive to said at least one stored test signal retrieved by said first retrieving means, for transmitting light along at least one of said plurality of fibre optic cabled light paths;

an optical receiver means, responsive to said at least one stored receiver sensitivity retrieved by said second retrieving means, for receiving light in response to light transmissions by said optical transmitter means on at least one of said plurality of fibre optic cabled light paths and for producing actual response data in response thereto;

optical coupler means, responsive to said transmitter means, said receiver means and at least one of said cabled light paths, for coupling light transmitted by said transmitter means into said at least one of said cabled light paths, and for coupling light received along at least one of said cabled light paths into said receiver means; and comparator means responsive to said receiver means and to said programmable data storage means, for comparing actual response data with expected response data and providing an output indicative of said comparison: and said base station comprising:

base station memory means;

means for communicating with the data storage means of said hand-held test set and for storing test signals and receiver sensitivities therein and, responsive to said data storage means, for reading actual response data stored therein;

an optical receiver means responsive to said test set optical transmitter means for providing calibration information to a base station memory means; and an optical transmitter for providing a test signal to said test set optical receiver means and for causing said hand set receiver means to generate a received calibration signal which is provided to that base station memory means, responsive to said base station memory for adjusting the calibration of said hand set transmitter means and said hand set receiver means.

* * * * *